United States Patent
Tani et al.

[19]

[11] Patent Number: 5,822,857
[45] Date of Patent: Oct. 20, 1998

[54] METHOD OF REPAIRING SHED PORTION OF COMPOSITE INSULATOR

[75] Inventors: Takao Tani, Ama-Gun; Hiroshi Kashiwagi, Nagaya, both of Japan

[73] Assignee: NGK Insulators, Ltd., Japan

[21] Appl. No.: 818,718

[22] Filed: Mar. 14, 1997

[30] Foreign Application Priority Data

Mar. 18, 1996 [JP] Japan ................................. 8-061032
Oct. 25, 1996 [JP] Japan ................................. 8-283497

[51] Int. Cl.⁶ .................................................. H01B 19/00
[52] U.S. Cl. ................................................................ 29/887
[58] Field of Search ............................................... 29/887

[56] References Cited

U.S. PATENT DOCUMENTS 3,721,277  3/1973  Rauscher et al. ................ 29/460 X
4,440,975  4/1984  Kaczerginski .................... 29/887 X
5,736,208  4/1998  Wilck et al. ...................... 29/887 X

*Primary Examiner*—Joseph J. Hail, III
*Assistant Examiner*—William Hong
*Attorney, Agent, or Firm*—Parkhurst & Wendel, L.L.P.

[57] ABSTRACT

A disclosed method of repairing a shed portion of a composite insulator having a core portion, a sheath portion arranged on an outer surface of the core portion, and a plurality of shed portions projected from the sheath portion, includes the steps of, (1) cutting out the shed portion having defects from a portion thereof adjacent to the sheath portion, and connecting a new shed portion having the same shape as that of the cut out shed portion to the sheath portion at the cut out portion, or (2) cutting out partly said shed portion having defects, and connecting a repairing member to said cut out portion. Therefore, it is possible to perform the shed portion repairing operation without wasting the normal shed portions.

5 Claims, 8 Drawing Sheets

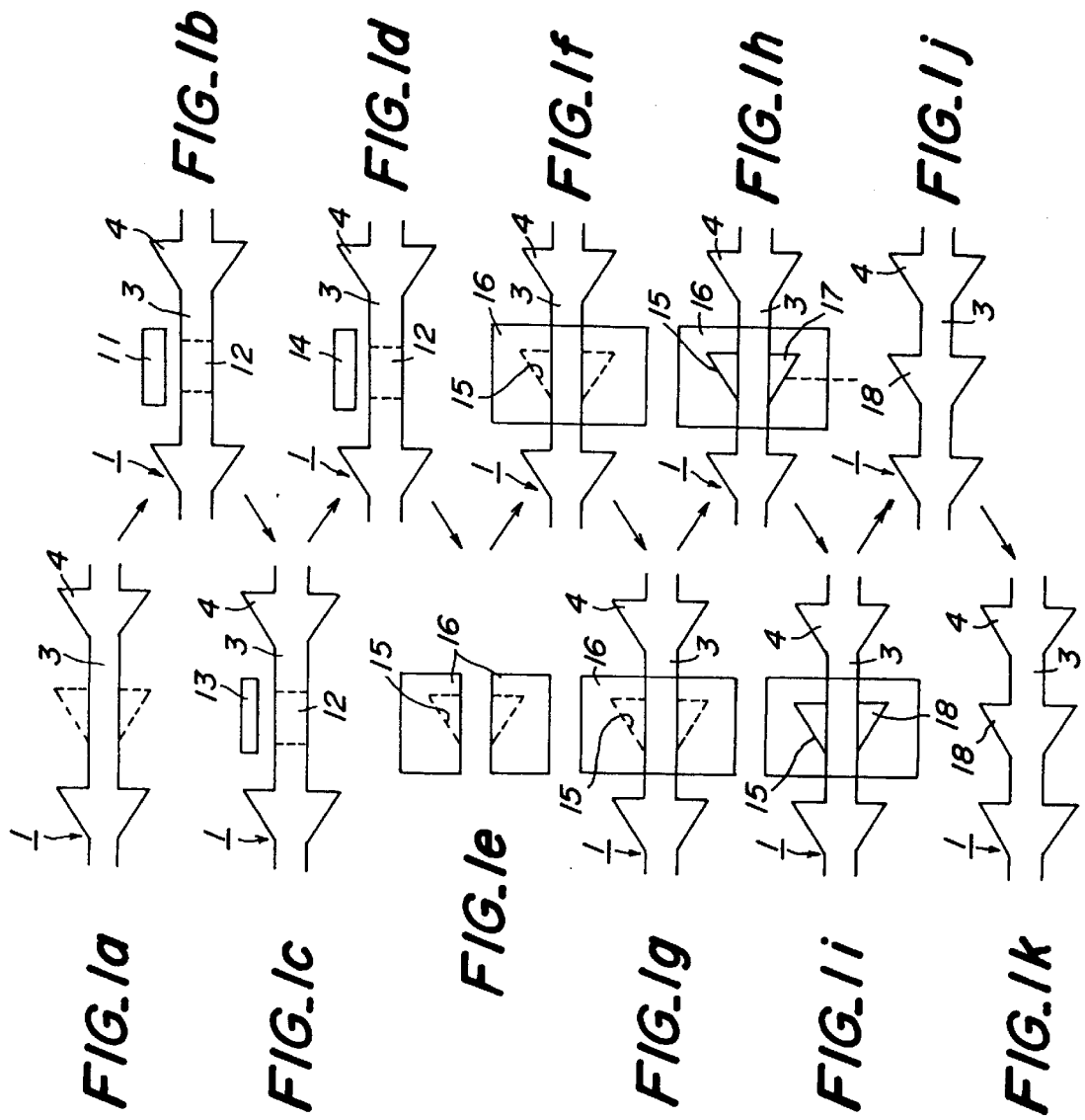

FIG._2a
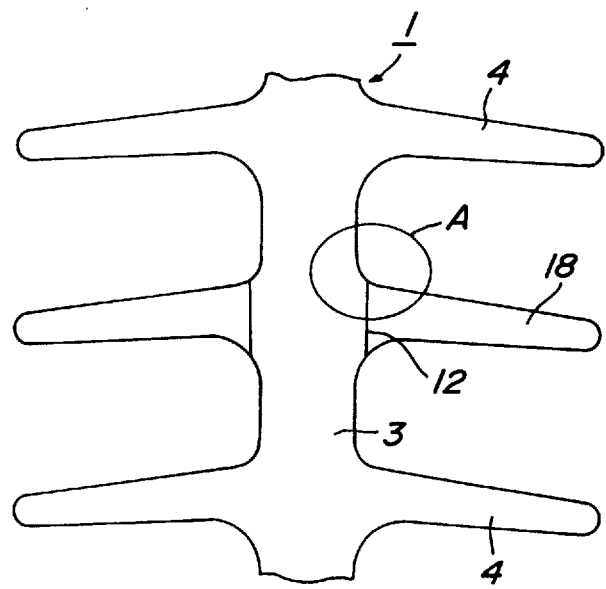
FIG._2b
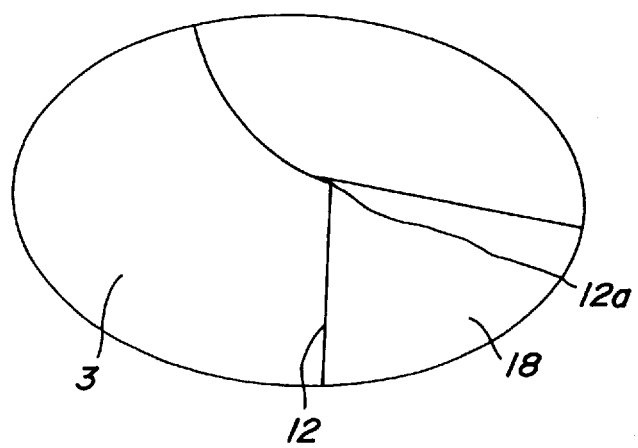

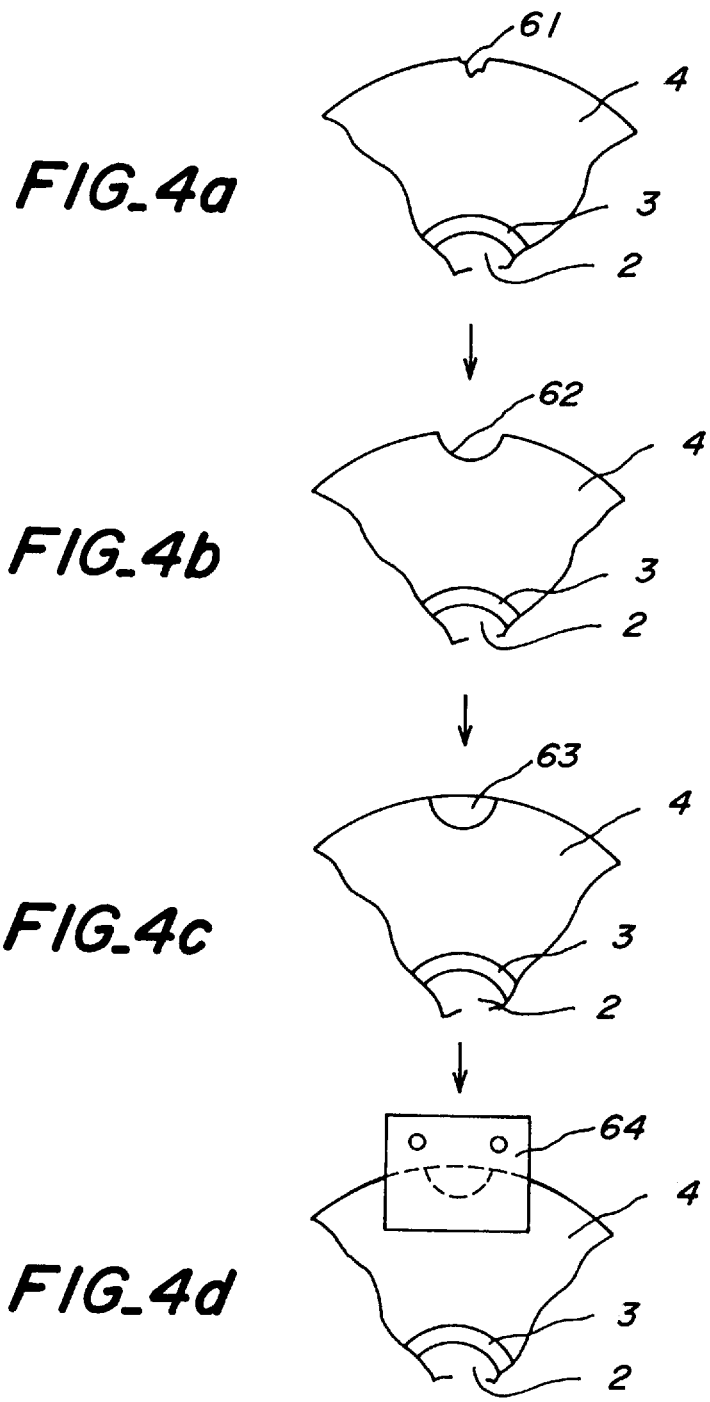

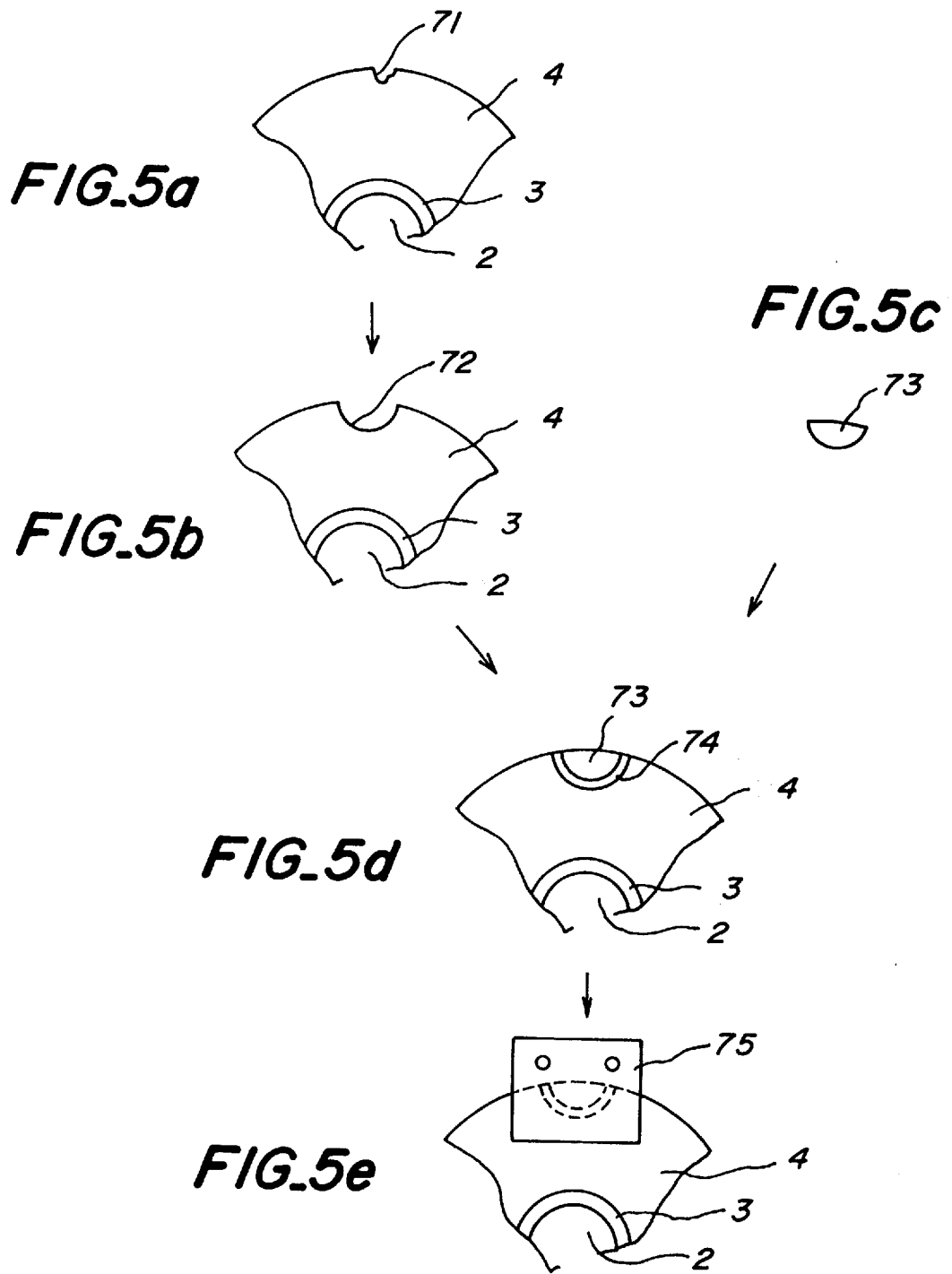

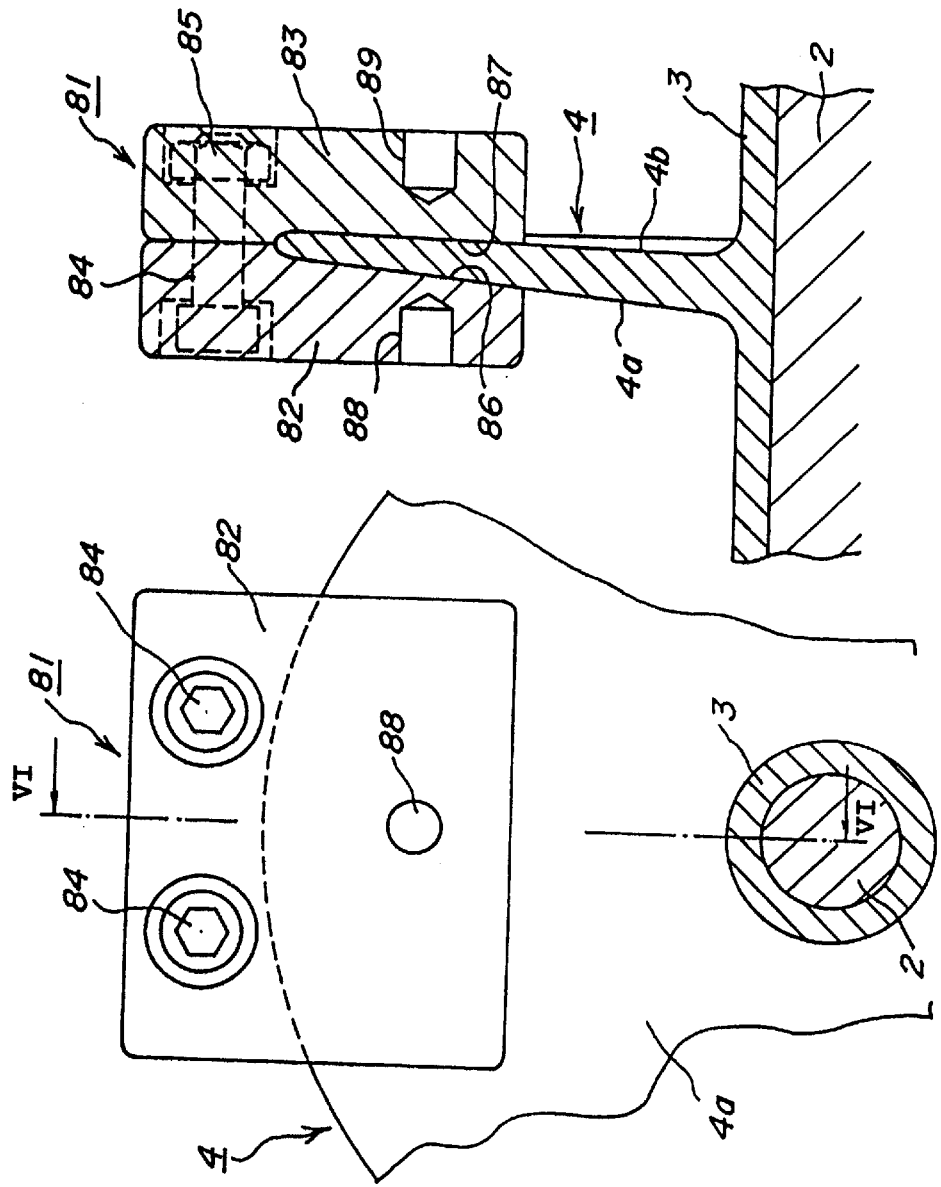

FIG_9
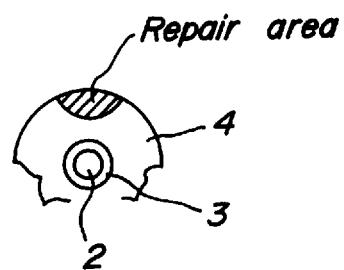
FIG_10
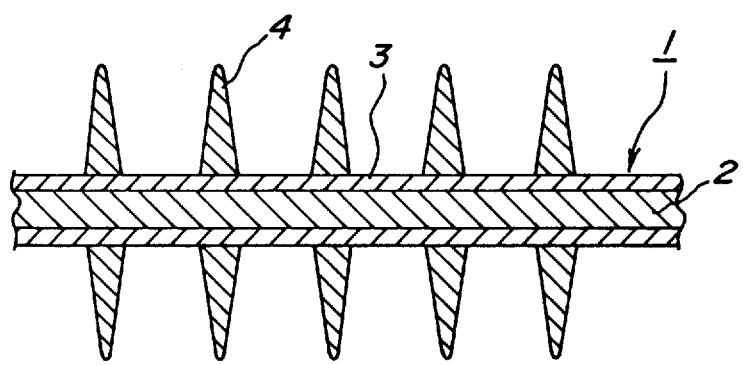

METHOD OF REPAIRING SHED PORTION OF COMPOSITE INSULATOR

BACKGROUND OF THE INVENTION

(1) Field of the Invention

The present invention relates to a method of repairing a shed portion of a composite insulator having a core portion, a sheath portion arranged on an outer surface of the core portion, and shed portions projected from the sheath portion. In this invention, a term "composite insulator" means a wide concept such that it includes not only a polymer insulator having the core portion made of for example FRP rod but also a polymer hollow insulator, a hollow SP insulator, or the like each having the core portion made of for example FRP cylinder.

(2) Related Art Statement

FIG. 10 is a cross sectional view showing one embodiment of a polymer insulator as one example of a composite insulator to be repaired. In the embodiment shown in FIG. 10, a polymer insulator 1 comprises an FRP core 2, a sheath portion 3 arranged on an outer surface of the FRP core 2, and a plurality of shed portions 4 projected on said sheath portion 3. In the polymer insulator 1 mentioned above, the sheath portion 3 and the shed portions 4 made of for example silicone rubber are integrally formed on an outer surface of the FRP core 2 by means of a metal mold not shown. In the case of forming the polymer insulator 1, it is known that defects such as inclusion of foreign substances and non-cured portion are liable to be generated at a periphery of the shed portion.

As mentioned above, the polymer insulator 1 to be repaired according to the invention has a plurality of shed portions 4. Therefore, if defects are generated in one shed portion 4 after producing the polymer insulator 1 or during an actual use of the polymer insulator 1, an overall polymer insulator 1 becomes a defect product and thus is scrapped together with the shed portions 4 having no defects, so that a using efficiency of the polymer insulator 1 is decreased. Moreover, since the overall polymer insulator 1 must be scrapped even if it has many normal shed portions 4, an amount of scrapped polymer insulators 1 is increased. In addition, if the polymer insulator 1 to be scrapped has a long size, scrapping steps are increased. As a result, labor, cost and so on for scrapping the polymer insulators 1 having defects are also increased.

In order to solve the drawbacks mentioned above, it is possible to think an idea such that the polymer insulator 1 is designed on the basis of a higher safety rate or that a new method of producing the polymer insulator 1 having no defects is realized. However, if the polymer insulator 1 is designed on the basis of a higher safety rate, raw materials are wasted and an amount of the scrapped polymer insulators are increased in the same manner as the above mentioned embodiment in which the overall polymer insulators having defects are scrapped, so that it is not possible to produce the polymer insulator 1 in a highly efficient manner. Moreover, it takes a lot of times and cost so as to realize the new method of producing the polymer insulator having no defects. Therefore, the known techniques can not solve the drawbacks mentioned above basically.

SUMMARY OF THE INVENTION

An object of the invention is to eliminate the drawbacks mentioned above and to provide a method of repairing a shed portion in which only the shed portion having defects can be repaired without wasting normal shed portions.

According to a first aspect of the invention, a method of repairing a shed portion of a composite insulator having a core portion, a sheath portion arranged on an outer surface of said core portion, and a plurality of shed portions projected from said sheath portion, comprising the steps of, cutting out said shed portion having defects from a portion thereof adjacent to said sheath portion, and connecting a new shed portion having the same shape as that of said cut out shed portion to said sheath portion at said cut out portion.

According to a second aspect of the invention, a method of repairing a shed portion of a composite insulator having a core portion, a sheath portion arranged on an outer surface of said core portion, and a plurality of shed portions projected from said sheath portion, comprises the steps of, cutting out partly said shed portion having defects, and connecting a repairing member to said cut out portion.

In this invention, it is possible to repair only the shed portion having defects without wasting the other normal shed portions by cutting out the shed portion having defects from a portion thereof adjacent to the sheath portion, and connecting a new shed portion having the same shape as that of the cut out shed portion to the sheath portion at the cut out portion.

BRIEF DESCRIPTION OF THE DRAWINGS

FIGS. 1a–1k are schematic views respectively showing repairing steps of a shed portion according to a first aspect of the invention;

FIGS. 2a and 2b are schematic views respectively illustrating a preferred embodiment according to a first aspect of the invention;

FIGS. 4a–4d are schematic views respectively showing repairing steps of a shed portion according to a second aspect of the invention;

FIGS. 5a–5e are schematic views respectively illustrating another repairing steps of a shed portion according to a second aspect of the invention;

FIGS. 6a–6b are schematic views respectively depicting one embodiment of a metal mold used in a method of repairing a shed portion according to a second aspect of the invention;

FIG. 9 is a schematic view for explaining a repair area in an embodiment according to a second aspect of the invention; and FIG. 10 is a cross sectional view showing one embodiment of a polymer insulator as one example of a composite insulator to which the invention is applied.

DESCRIPTION OF THE PREFERRED EMBODIMENTS

Figure 3B:
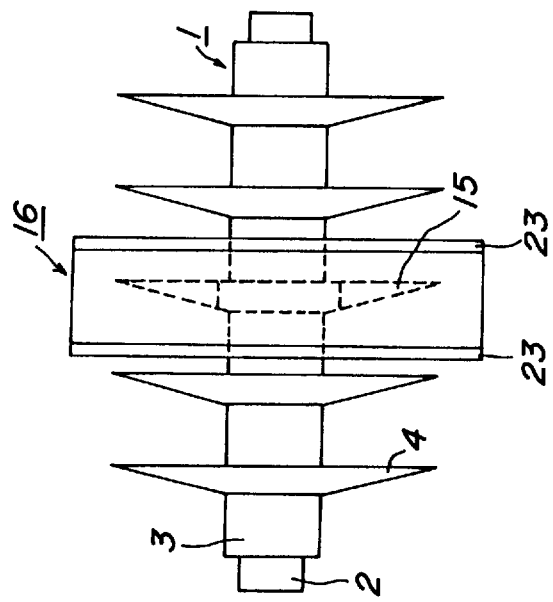
FIGS. 3a and 3b are schematic views respectively depicting a preferred embodiment for supplying a non-cured rubber according to a first aspect of the invention.

FIGS. 1a–1k are schematic views respectively explaining actual steps of a method of repairing a shed portion of a composite insulator according to a first aspect of the invention. In the embodiment shown in FIGS. 1a–1k, respective portions are shown in a modified manner for the sake of easy understandings. Moreover, as is the same as the embodiment shown in FIG. 4a–d, the polymer insulator 1 comprises an FRP core 2, a sheath portion 3 arranged on an outer surface of the FRP core 2, and a plurality of shed portions 4 projected on said sheath portion 3.

At first, as shown in FIG. 1a by a dotted line, the shed portion 4 having defects of the polymer insulator 1 is cut out from a portion existing at a root of the sheath portion 3. Then, as shown in FIG. 1b, a surface of a cut out portion 12 of the sheath portion 3 is made coarse by means of for example a sand blast apparatus 11 as a preliminary treatment in accordance with a kind of rubbers to be used.

Then, as shown in FIG. 1c, a coarse surface of the cut out portion 12 is washed by alcohol by means of for example a washing apparatus 13. Then, as shown in FIG. 1d, a coarse surface of the cut out portion 12 washed by alcohol is dried by means of for example a drying apparatus 14. A drying time is not particularly limited, but generally it takes about 15 minuets.

On the other hand, as shown in FIG. 1e, a pair of metal mold 16 with a cavity 15 having an inner shape equal to that of the cut out shed portion 4 is prepared. Then, as shown in FIG. 1f, the metal mold 16 is set to the cut out portion 12 from which the shed portion 4 to be repaired is cut out. Then, as shown in FIG. 1g, the metal mold 16 and a portion of the sheath portion 3 adjacent to the shed portion 4 to be repaired is preliminarily heated. It is preferred to perform the preliminarily heating since no shape distortion due to a thermal shrinkage is generated after a curing step mentioned below.

Then, as shown in FIG. 1h, a non-cured rubber 17 is supplied into the cavity 15 of the metal mold 16. As the non-cured rubber 17, it is preferred to use a rubber having the same chemical composition as that of the sheath portion 3 and the other shed portions 4, and generally silicone rubber is used. Then, as shown in FIG. 1i, the non-cured rubber 17 in the cavity 15 is cured under a temperature of for example 160° C. to form a new repaired shed portion 18. Then, as shown in FIG. 1j, the metal mold 16 is detached. Finally, as shown in FIG. 1k, a surface of the polymer insulator 1 having the new repaired shed portion 18 is worked if necessary to obtain the polymer insulator 1 in which a repairing operation is finished.

FIGS. 2a and 2b are schematic views respectively explaining a preferred embodiment of the method of repairing the shed portion of the composite insulator according to the invention. FIG. 2a shows a portion of the repaired shed portion 18 and FIG. 2b shows an enlarged portion of A in FIG. 2a. In the embodiment shown in FIGS. 2a and 2b, when the non-cured rubber 17 is supplied into the cavity 15, the non-cured rubber 17 is arranged over an end portion 12a of the cut out portion 12. Therefore, an end portion of the repaired shed portion 18 after curing is overlapped on the end portion 12a of the cut out portion 12, and thus it is preferred since a joint portion between the cut out portion 12 and the repaired shed portion 18 is not remarkable.

Figure 3A:
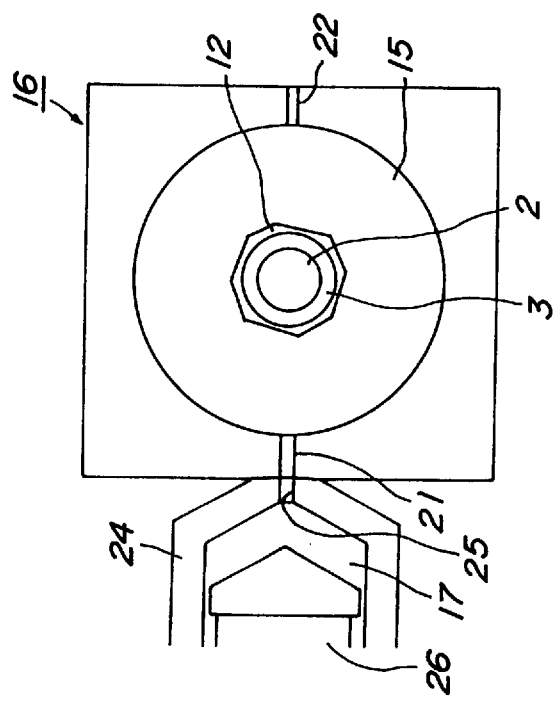

FIGS. 3a and 3b are schematic views respectively showing a preferred embodiment of a non-cured rubber supplying step in the method of repairing the shed portion of the composite insulator according to the invention. As shown in FIG. 3a, the metal mold 16 has a rubber supply inlet 21 at its one end and a leak gate 22 arranged at a portion remote from the rubber supply inlet 21. Moreover, a heat insulation plate 23 is arranged at both major surfaces of the metal mold 16. In this embodiment, a nozzle 25 of a rubber supply apparatus 24 is inserted into the rubber supply inlet 21, and the non-cured rubber 17 is supplied into the cavity by driving a piston 26 of the rubber supply apparatus 24.

In the embodiment shown in FIGS. 3a and 3b, when the non-cured rubber 17 is supplied into the cavity 15 of the metal mold 16, it is necessary to control a pressure of the non-cured rubber 17 so as not to leak the non-cured rubber 17 from the sheath portion 7 and so as to obtain the repaired shed portion 18 having a most suitable shape. In this embodiment, a pressure control during a rubber supplying step is performed by controlling a relative relation between a diameter and a length of the rubber supply inlet 21. Moreover, a pressure control in the cavity 15 is performed by controlling a relative relation between a diameter and a length of the leak gate 22.

As one example using a high temperature vulcanization rubber, an inner pressure of the cavity 15 just after the rubber supplying operation of the non-cured rubber 17 is finished is controlled in a range of 10–60 $kgf/cm^2$. If the inner pressure is low, there is the case such that the shed portion to be repaired is not formed. Moreover, if the inner pressure is larger than about 70 $kgf/cm^2$, a remaining rubber of the cut out portion 12 is pushed toward the metal mold 16 and thus the non-cured rubber 17 is not arranged uniformly over the end portion 12a. In this case, there is a case such that the joint portion is exposed on a surface of the shed portion 4. Further, if the inner pressure is larger than about 85 $kgf/cm^2$, the non-cured rubber is leaked from a connection surface between the sheath portion 3 and the metal mold 16, so that an appearance of the sheath portion 3 is deteriorated.

Moreover, as shown in FIGS. 3a and 3b, if a curing of the non-cured rubber 17 in the cavity 15 is performed under such a condition that the nozzle 25 of the rubber supplying apparatus 24 is kept connecting to the rubber supply inlet 21, it is preferred since the non-cured rubber in the cavity 15 is not returned from the cavity 15 and the rubber supplying pressure can be decreased. Further, if a diameter of the rubber supply inlet 21 is designed larger, the rubber supplying pressure can be decreased and thus the metal mold 16 can be designed more thinner. Therefore, it is preferred since the shed portion repairing operation can be performed for the polymer insulator having a narrow shed pitch.

In the embodiment shown in FIGS. 3a and 3b, if the pressure in the cavity 15 is controlled by using the leak gate 22 as mentioned above, it is preferred since a weight measuring operation of the non-cured rubber to be supplied into the cavity 15 can be eliminated which is required in the case of having no leak gate. Moreover, in the embodiment shown in FIGS. 3a and 3b, since the heat insulation plate 23 is arranged at both major surfaces of the metal mold 16, the non-cured rubber leaked from the sheath portion 3 is discharged to a portion thermally isolated from the cavity 15 due to the heat insulation plate 23 and thus it is not cured. Therefore, it is preferred since the shed repairing operation can be performed in such a manner that the non-cured rubber 17 leaked from the cavity 15 is not adhered to the adjacent shed portions 4.

As can be understood from the above, according to a first aspect of the invention, since only the shed portion having defects is repaired, it is possible to repair the shed portion having defects without wasting the normal shed portions. Moreover, since the repairing operation can be easily performed by using the metal mold and a little more apparatuses, it is possible to perform the shed repairing operation easily without using special apparatuses such as the weight measuring apparatus or the like.

FIGS. 4a–4d are schematic views respectively explaining actual steps of a method of repairing a shed portion of a composite insulator according to a second aspect of the invention. In the embodiment shown in FIGS. 4a–4d, only the shed portion 4 including a defect portion 61 at a peripheral portion is shown in a modified manner for the sake of easy understandings. Also in this embodiment according to a second aspect of the invention, the polymer insulator 1 comprises the FRP core 2, the sheath portion 3 arranged on an outer surface of the FRP core 2, and a plurality of shed portions 4 projected from the sheath portion 3, as shown in FIG. 10.

In this embodiment, at first, in the case that the defect portion 61 exists at a shed peripheral portion of the shed portion 4 as shown in FIG. 4a, a shed peripheral portion including the defect portion 61 having a little larger area is cut out partly to form a cutting out shed peripheral portion 62, as shown in FIG. 4b. Then, as shown in FIG. 4c, for example non-cured silicone rubber 63 preferably having a same chemical composition as that of the shed portion 4 is filled in the cutting out shed peripheral portion 62 in such a manner that it has a little larger dimension as that of the actual shed peripheral portion to be repaired. Then, as shown in FIG. 4d, a metal mold 64 is set in such a manner that it covers a part of the shed peripheral portion and the non-cured silicone rubber 62. Under such a condition, an overall metal mold 64 is heated by a heating apparatus at for example 160° C. for 60 minutes, and then metal mold 64 is detached. Finally, a repaired portion is finely worked to obtain the polymer insulator 1 to which the repairing operation according to the invention is applied.

FIGS. 5a–5e are schematic views respectively explaining another method of repairing a shed portion of a composite insulator according to a second aspect of the invention. In this embodiment, at first, in the case that the defect portion 71 exists at a shed peripheral portion of the shed portion 4 as shown in FIG. 5a, a shed peripheral portion including the defect portion 71 having a little larger area is cut out partly to form a cutting out shed peripheral portion 72, as shown in FIG. 5b. Then, a shed peripheral member 73 having a little smaller dimension than that of the cutting out shed peripheral portion 72 is prepared as shown in FIG. 5c. Here, the shed peripheral member 73 having a smaller dimension than that of the cutting out shed peripheral portion 72 means that surfaces of the shed peripheral member 73 which consist an upper surface and a lower surface of the shed portion 4 are substantially equal to those of the shed portion 4 if the shed peripheral member 73 is set to the cutting out shed peripheral portion 72. In addition, it means that there is a space for arranging the adhesives 74 between a surface of the shed peripheral member 73 which is opposed directly to the cutting out shed peripheral portion 72 and the cutting out shed peripheral portion 72 if the shed peripheral member 73 is set to the cutting out shed peripheral portion 72. It is preferred that the cutting out shed peripheral portion 72 is made of a material having the same chemical composition as that of the shed portion 4 such as a cured silicone rubber.

Then, as shown in FIG. 5d, the shed peripheral member 73 is set to the cutting out shed peripheral portion 72 via the adhesives 74. As the adhesives 74, it is preferred to use a material having the same chemical composition as that of the shed portion 4 and the shed peripheral member 73 such as a non-cured silicone rubber. After that, as shown in FIGS. 5e, a metal mold 75 is set in such a manner that it covers a part of the shed peripheral portion and the shed peripheral member 73. Under such a condition, an overall metal mold 75 is heated by a heating apparatus at for example 160° C. for 60 minutes, and then metal mold 64 is detached. Finally, a repaired portion is finely worked to obtain the polymer insulator 1 to which the repairing operation according to the invention is applied.

FIGS. 6a and 6b are schematic views respectively showing one embodiment of a metal mold used in a method of repairing a shed portion of a composite insulator according to a second aspect of the invention. FIG. 6a shows a plan view and FIG. 6b shows a b—b cross section in FIG. 6a. In the embodiment shown in FIGS. 6a and 6b, a metal mold 81 comprises a pair of an upper metal mold 82 and a lower metal mold 83 which are fixed with each other by means of respective two bolts 84 and nuts 85. Then, a cavity 86 which forms an upper surface 4a of the shed portion 4 is arranged in the upper metal mold 82. In addition, a cavity 87 which forms an lower surface 4b of the shed portion 4 is arranged in the lower metal mold 83.

As shown in FIG. 6b, a connection surface between the upper metal mold 82 and the lower metal mold 83 is straight at a portion in which the bolt 84 and the nut 85 are arranged if viewed from a side surface. However, in a portion of the cavity 86 and the cavity 87 which forms a periphery of the shed portion 4, the upper metal mold 82 becomes gradually thinner and the lower metal mold 83 becomes gradually thicker correspondingly toward an extending direction of the shed portion 4. In this embodiment, numerals 88 and 89 are screw holes used for supporting the metal mold 81 from the external.

According to the metal mold 81 having the construction mentioned above, if plural combinations between the upper metal mold 82 and the lower metal mold 82 having various dimensions are prepared, a method of a shed portion of a composite insulator according to a second aspect of the invention can be achieved by the most suitable combination which can be obtained by selecting the metal mold 81 having a little larger dimension than that of the cutting out shed peripheral portion 62. Moreover, materials of the upper metal mold 82 and the lower metal mold 83 are not limited particularly, but it is preferred to use a light weight and an easy working material such as aluminum since a temperature during the curing is up to 200° C.

Hereinafter, actual experiments according to a second aspect of the invention will be explained.

Experiment 1 (Test piece examination)

Figure 7:
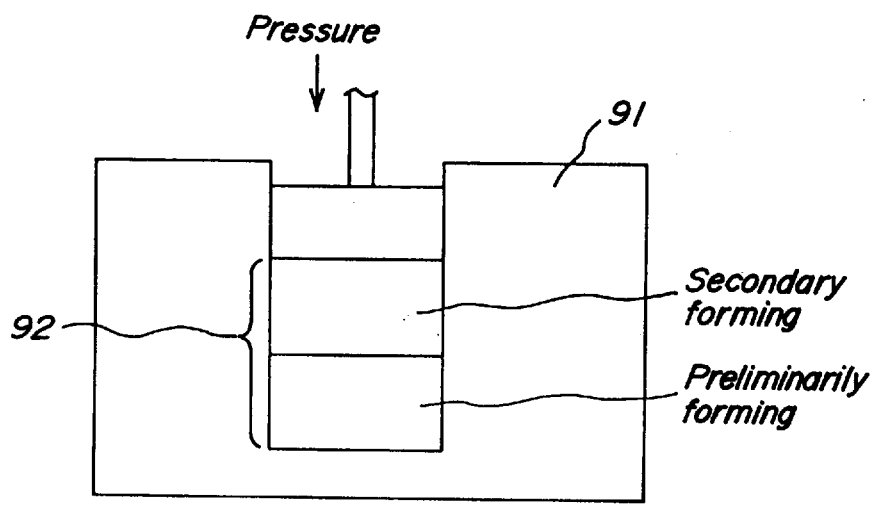
FIG. 7 is a schematic view showing one embodiment of a supporting member used in an embodiment according to a second aspect of the invention.

In order to examine a connection strength between the shed portion and the repaired portion which is formed by curing the non-cured rubber or the repaired portion which is formed by using the shed peripheral member and to examine whether bubbles exist or not in the connection portion, test pieces were formed by using a forming apparatus 91 in the manner as shown in FIG. 7. Then a tensile strength of the thus formed test pieces 92 was measured, and the connection portion was observed by a microscope.

As the test pieces, comparative example (sample Nos. 1-1~1-4) having no connection portion which was formed by curing the non-cured rubber integrally in the forming apparatus 91, curing example 1 (pressure during secondary curing; 1.5 kg/cm$^2$, sample Nos. 2-1~2-4), curing example 2 (pressure during secondary curing; 3.0 kg/cm$^2$, sample Nos. 3-1~3-4), curing example 3 (pressure during secondary curing; 3.0 kg/cm$^2$, sample Nos. 4-1~4-4) in which non-cured silicone rubber was once cured in the forming apparatus 91 under a pressure of 3.0 kg/cm$^2$ (primary curing) and then non-cured silicone rubber which is supplied in the forming apparatus 91 after the primary curing is cured under the respective above pressure (secondary curing), and connection example (sample Nos. 5-1~5-4) in which two preliminarily cured silicone rubbers were set in the forming apparatus 91 via non-cured silicone rubber and the non-cured silicone rubber was cured by heat, were prepared.

Figure 8:
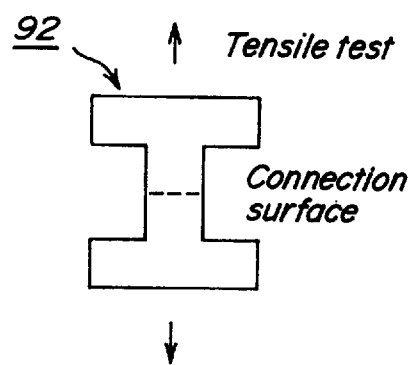
FIG. 8 is a schematic view illustrating a sample piece used in an embodiment according to a second aspect of invention.

The thus prepared test pieces were worked as shown in FIG. 8 in such a manner that the connection surface exists at a center portion. Then, the thus worked test pieces were subjected to the tensile test. Moreover, the test pieces were cut out at the connection surface, and the cut out surface was observed by a microscope. The results of the tensile test are shown in the following Table 1.

TABLE 1

| Sample No. | | Tensile strength (kg/cm$^2$) | |
|---|---|---|---|
| Comparative example (no connection) | 1-1 | 43.0 | Average 53.8 |
| | 1-2 | 51.3 | |
| | 1-3 | 63.2 | |
| | 1-4 | 58.0 | |
| Curing example 1 (Pressure 1.5 kg/cm$^2$) | 2-1 | 34.1 | Average 40.6 |
| | 2-2 | 45.8 | |
| | 2-3 | 41.9 | |
| Curing example 2 (Pressure 3.0 kg/cm$^2$) | 3-1 | 53.2 | Average 45.4 |
| | 3-2 | 46.7 | |
| | 3-3 | 43.2 | |
| | 3-4 | 38.6 | |
| Curing example 3 (Pressure 4.5 kg/cm$^2$) | 4-1 | 39.1 | Average 42.7 |
| | 4-2 | 50.8 | |
| | 4-3 | 43.2 | |
| | 4-4 | 37.7 | |
| Connection example | 5-1 | 43.1 | Average 44.3 |
| | 5-2 | 44.4 | |
| | 5-3 | 45.5 | |

From the results shown in Table 1, it is understood that all the examples according to the invention has a sufficient tensile strength since all the examples according to the invention show an average tensile strength of 80% or more of 53.8 kg/cm$^2$ which is the average tensile strength of the comparative example having no connection and assumed to show the best tensile strength.

Moreover, from the results of the microscope observation, it is understood that many bubbles are observed on the cut out surface of the comparative example to which no pressure is applied, but no bubbles are observed on the cut out surface of the examples according to the invention to which a pressure during curing of larger than 1.5 kg/cm$^2$ is applied. Therefore, it is understood that if the pressure of larger than 1.5 kg/cm$^2$ is applied during curing, it is possible to repair the shed portion in such a manner that no bubble is generated in the connection portion.

Experiment 2 (Estimation of electric properties)

Electric properties of the composite insulator which was repaired according to the repairing method of the invention were estimated. At first, as specimen A, polymer insulators according to the invention having sheath diameter: 26 mm, shed diameter: 203 mm, effective insulation length: 126 mm, and repair area shown in FIG. 9: 300 mm$^2$ were prepared according to the repairing method shown in FIG. 4. Moreover, as specimen B, polymer insulators according to the invention having sheath diameter: 32 mm, shed diameter: 203 mm, effective insulation length: 172 mm, and repair are shown in FIG. 9: 300 mm$^2$ were prepared according to the repairing method shown in FIG. 5.

With respect to the thus prepared polymer insulators according to the specimen A and the specimen B, a commercial frequency voltage test and a flashover voltage test were performed according to IEC standard. At first, five dry flashover voltages were measured for respective specimens, and whether through holes were generated or not at the repaired portion was observed. As a result, in the specimen A, measured five dry flashovers voltages were 117 KV, 118 KV, 119 KV, 114 KV and 116 KV, all the flashover were outer flashovers, and no through holes were observed at the repaired portion. Moreover, in the specimen B, measured five dry flashover voltages were 134 KV, 135 KV, 113 KV, 139 KV and 131 KV, all the flashovers were outer flashovers, and no through holes were observed.

Then, a surge voltage test was performed under a condition of surge voltage: larger than 1000 KV/$\mu$s and voltage apply time: 25 times for respective positive electrode and negative electrode, and whether through holes were generated or not at the repaired portion was observed. Actually, in the specimen A, a voltage was applied at 25 times under such a condition that a surge voltage was 1500 KV/$\mu$s for the positive electrode and a maximum voltage was 422 KV, while a voltage was applied at 25 times under such a condition that a surge voltage was 1550 KV/$\mu$s for the negative electrode and a maximum voltage was 462 KV. As a result, only the outer flashover was observed in all the cases, and no through holes were observed at the repaired portion. Moreover, in the specimen B, a voltage was applied at 25 times under such a condition that a surge voltage was 1300 KV/$\mu$s for the positive electrode and a maximum voltage was 446 KV, while a voltage was applied at 25 times under such a condition that a surge voltage was 1590 KV/$\mu$s for the negative electrode and a maximum voltage was 463 KV. As a result, only the outer flashover was observed in all the cases, and no through holes were observed at the repaired portion.

From the results mentioned above, it is understood that the polymer insulator which is repaired according to the method of the invention has an excellent electric properties.

As can be understood from the above, according to a second aspect of the invention, since only the defect portion of the shed portion having the defect portion is partly repaired, it is possible to repair the shed portion of the composite insulator without wasting the normal shed portion with a least steps, a simple apparatus, and a minimum amount repairing member such as rubber.

What is claimed is:

1. A method of repairing a shed portion of a composite insulator having a core portion, a sheath portion arranged on an outer surface of said core portion, and a plurality of shed portions projected from said sheath portion, comprising the steps of, cutting out a section of said shed portion having defects which section is less than the entire shed portion itself, and connecting a repairing member to said cut out portion.

2. The method according to claim 1, wherein the improvement comprises the steps of cutting out a shed peripheral portion including said defect having a little larger area than that of said defect existing at said shed peripheral portion, disposing rubber material in said cutting out shed peripheral portion, positioning a metal mold on a part of said shed peripheral portion and said rubber material, and heating said metal mold.

3. The method according to claim 2, wherein said rubber material has a same chemical composition as that of said shed portion.

4. The method according to claim 2, wherein the improvement comprises the steps of cutting out a shed peripheral portion including said defect having a little larger area than that of said defect existing at said shed peripheral portion, preparing a shed peripheral member having a little smaller dimension than that of said cutting out shed peripheral portion, adhesively bonding said shed peripheral member to said cutting out shed peripheral portion, positioning a metal mold to a part of said shed peripheral portion and said shed peripheral member, and heating said metal mold.

5. The method according to claim 4, wherein said shed peripheral member and said adhesives have a same chemical composition as that of said shed portion.

* * * * *